Figure 1:
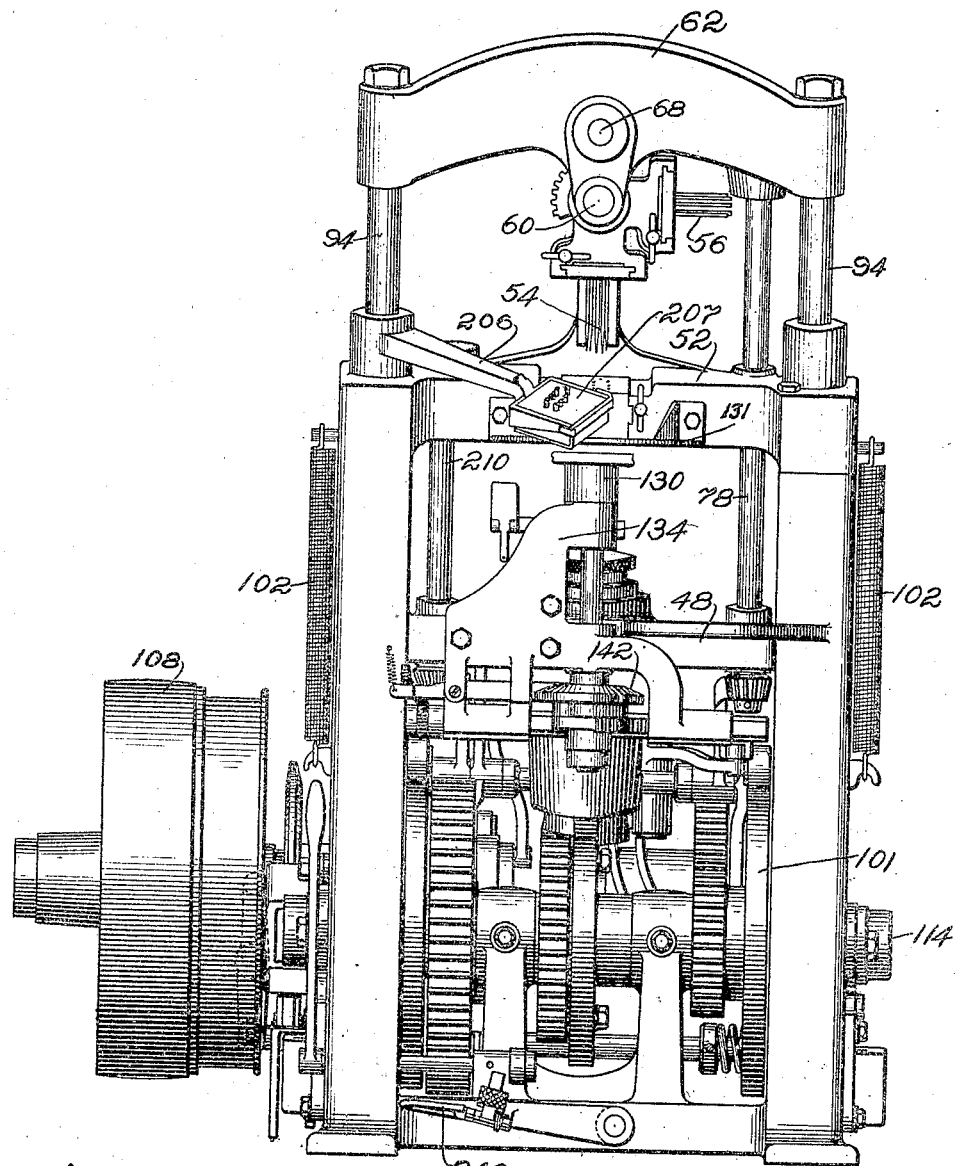

T. G. PLANT.
HEELING MACHINE.
APPLICATION FILED JAN. 27, 1908. RENEWED DEC. 9, 1909.

958,302.

Patented May 17, 1910.
10 SHEETS—SHEET 1.

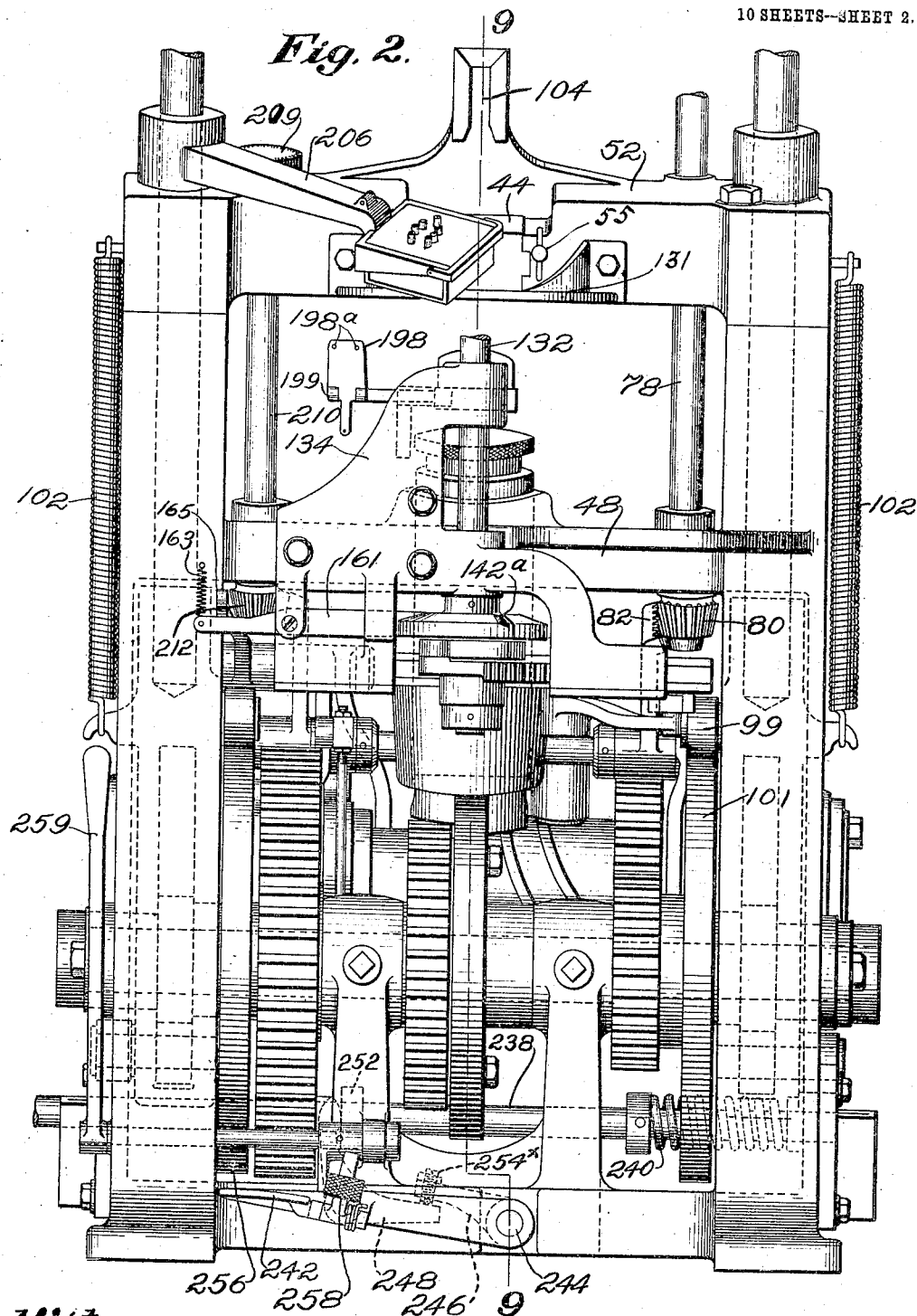

T. G. PLANT.
HEELING MACHINE.
APPLICATION FILED JAN. 27, 1908. RENEWED DEC. 9, 1909.
958,302.
Patented May 17, 1910.
10 SHEETS—SHEET 3.
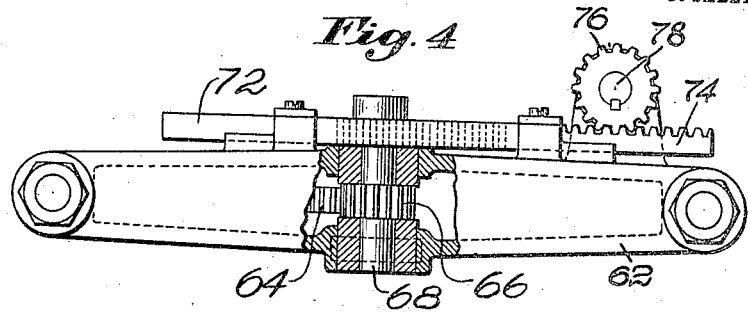
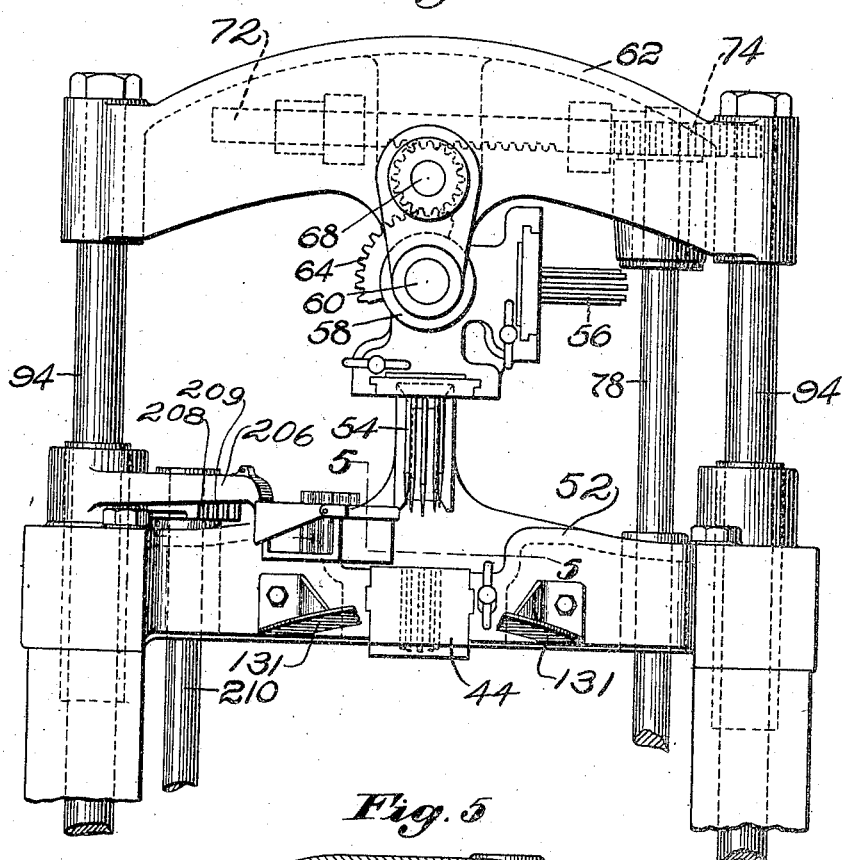
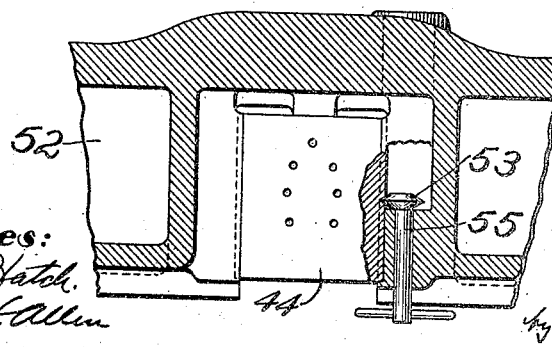
Witnesses:
Roswell F. Hatch.
Redfield H. Allen.
Inventor.
Thomas G. Plant,
by Robt. F. Havis,
Atty.

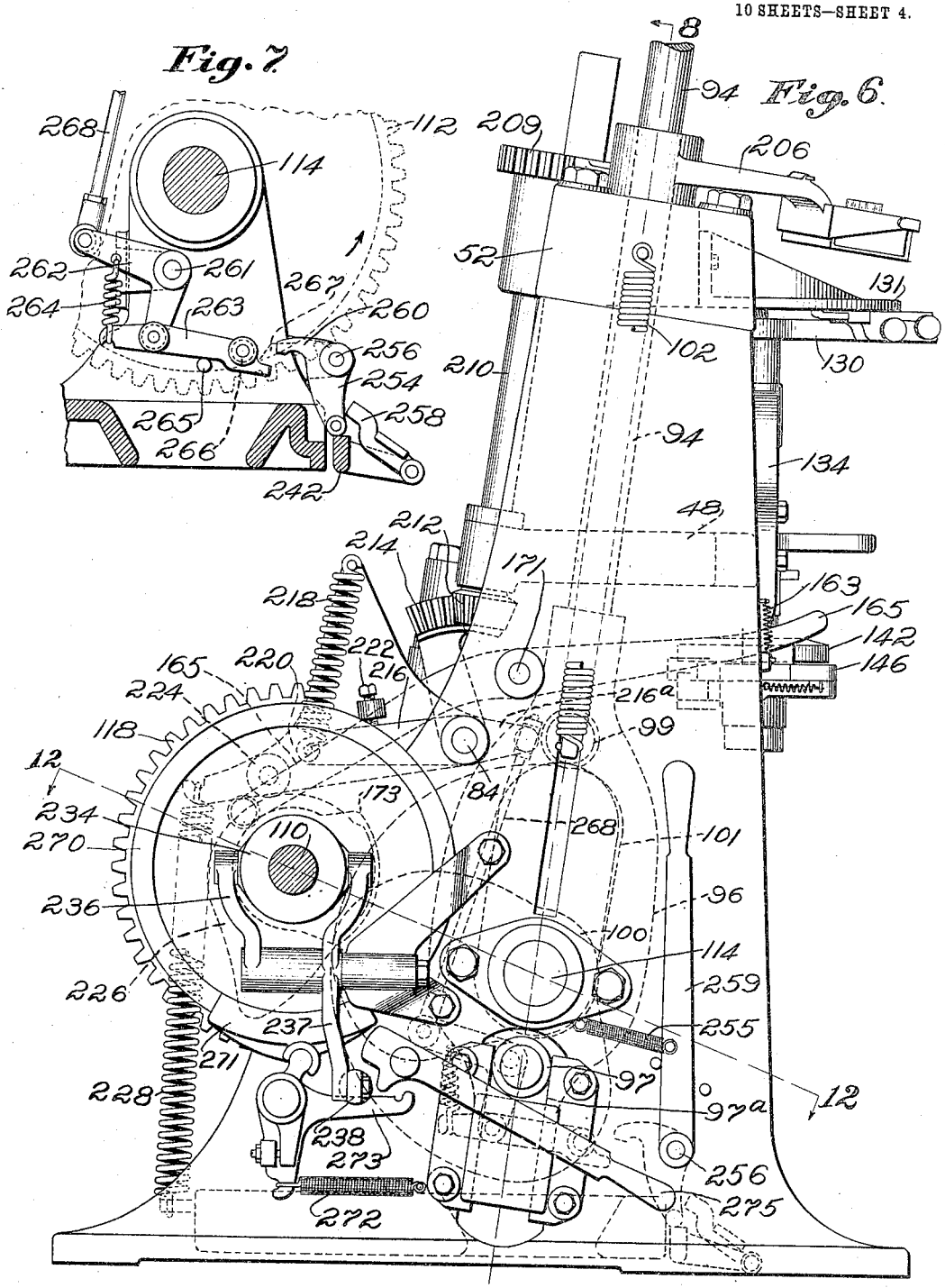

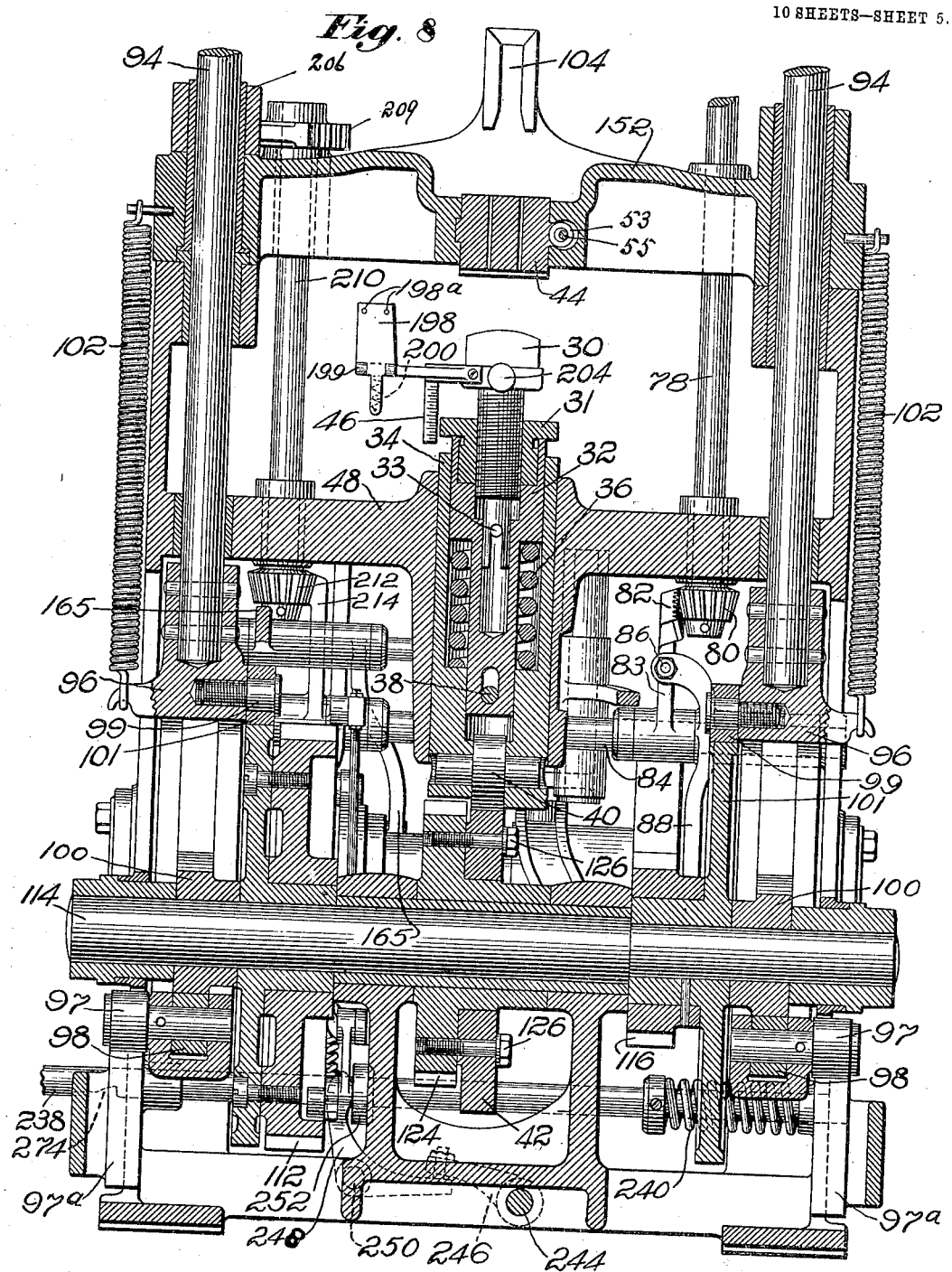

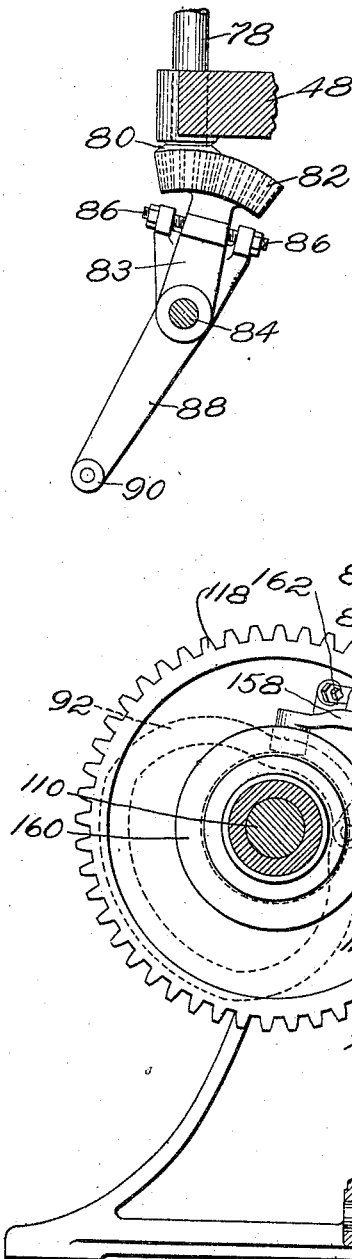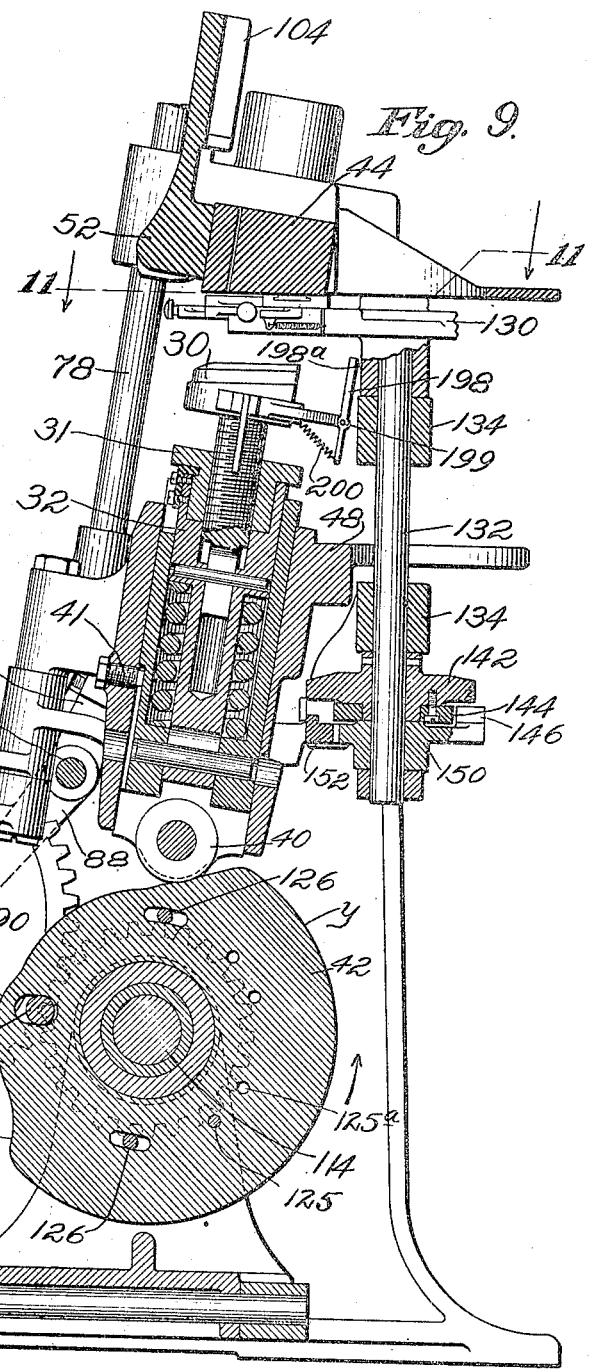

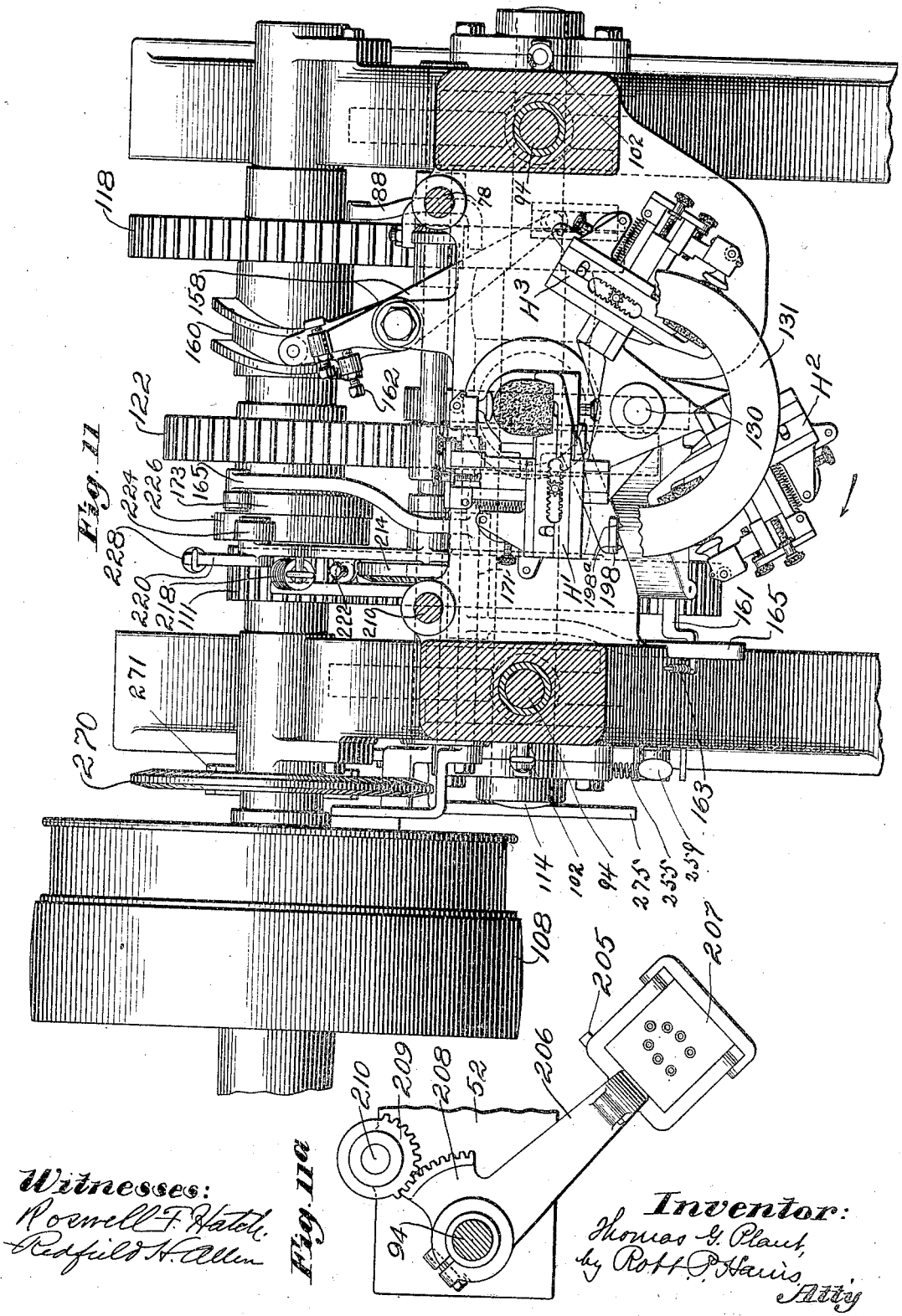

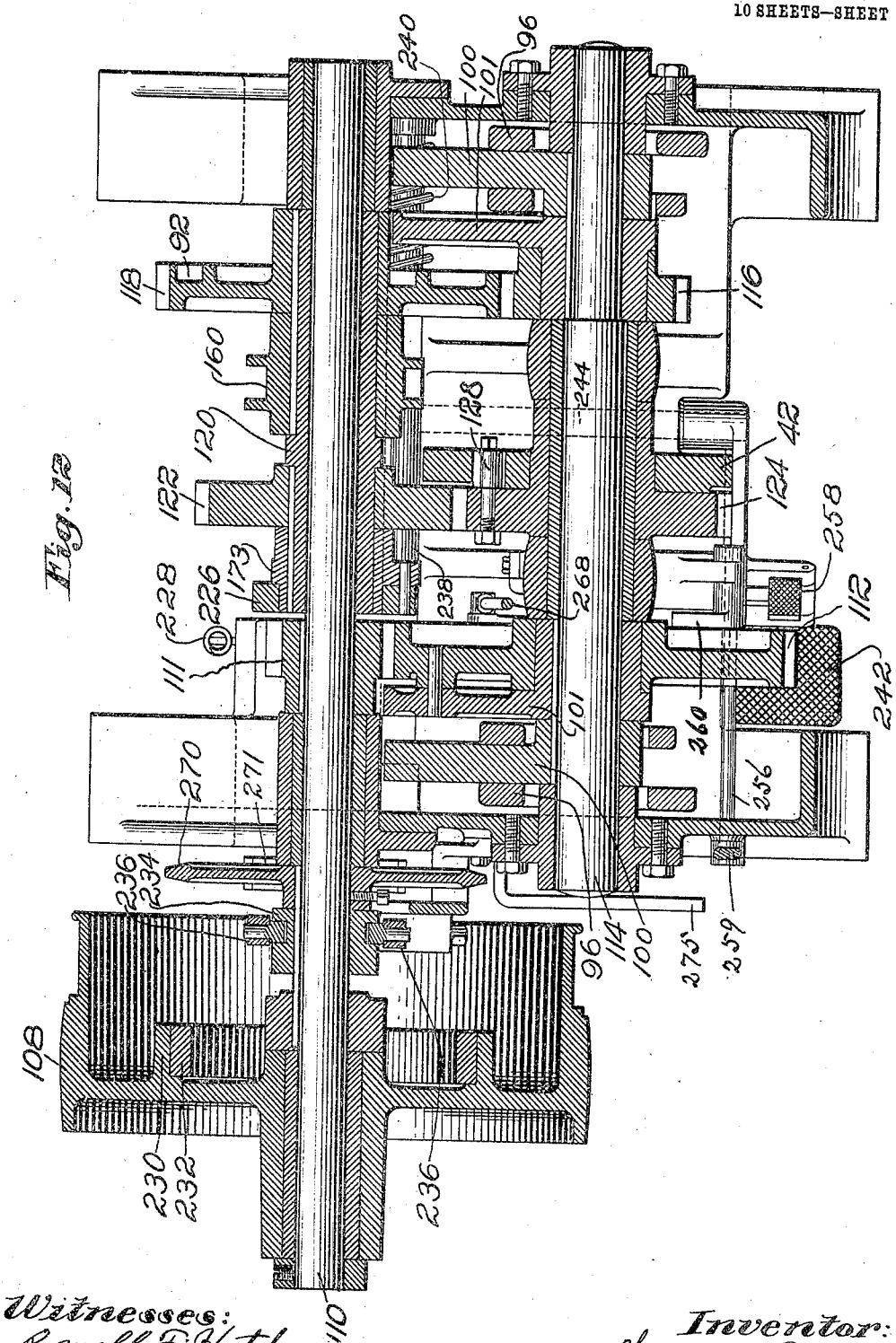

T. G. PLANT.
HEELING MACHINE.
APPLICATION FILED JAN. 27, 1908. RENEWED DEC. 9, 1909.
958,302.
Patented May 17, 1910.
10 SHEETS—SHEET 9.
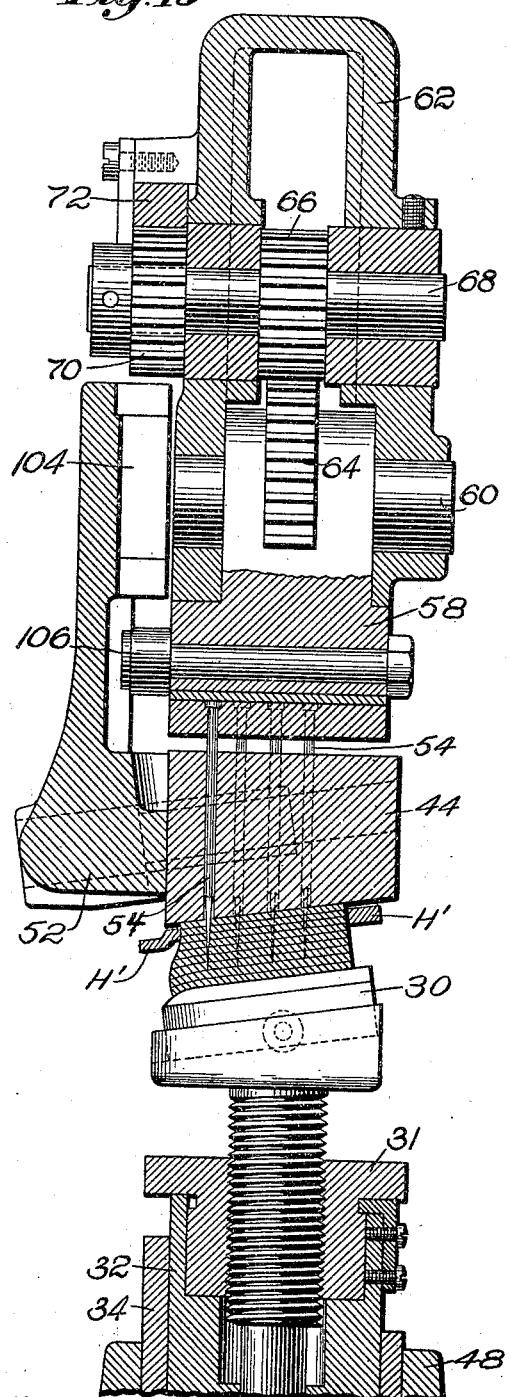
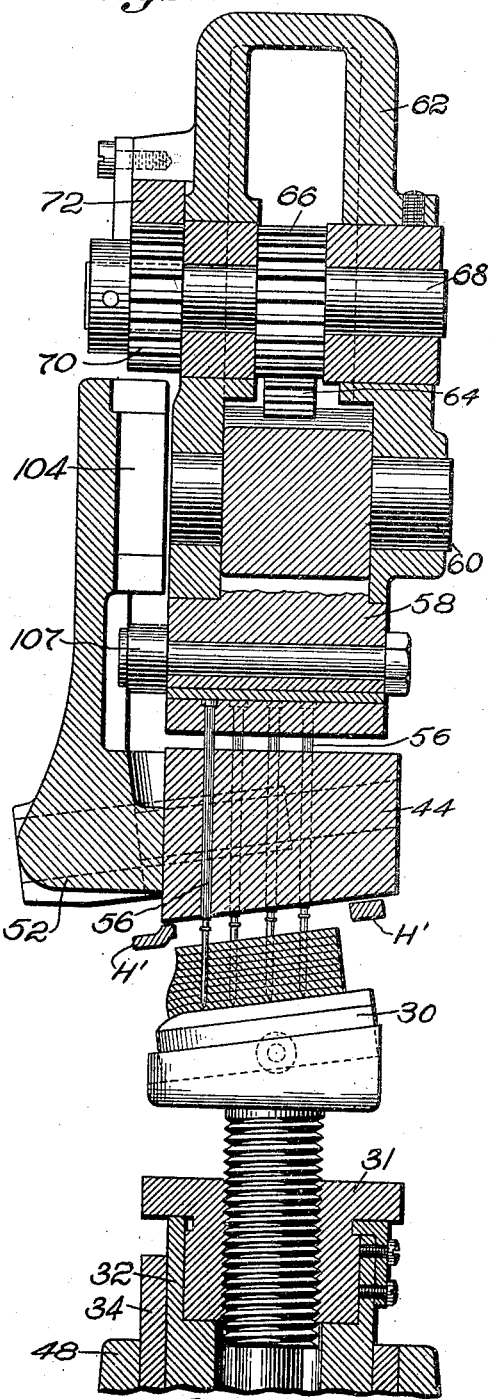
Witnesses:
Rowell F. Hatch.
Redfield H. Allen.
Inventor:
Thomas G. Plant
by Robt. P. Haus. Atty.

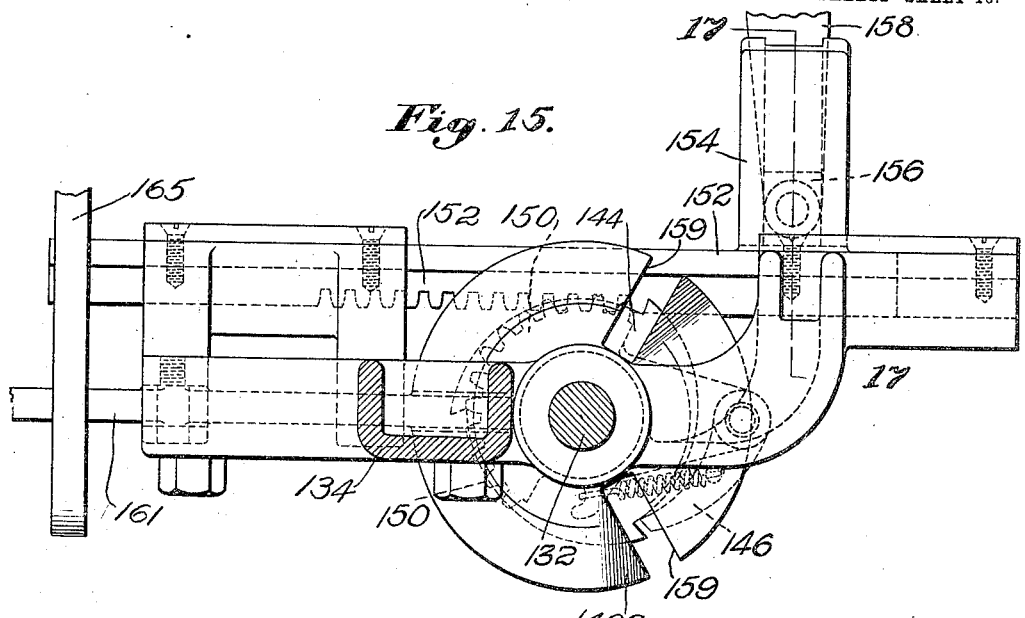
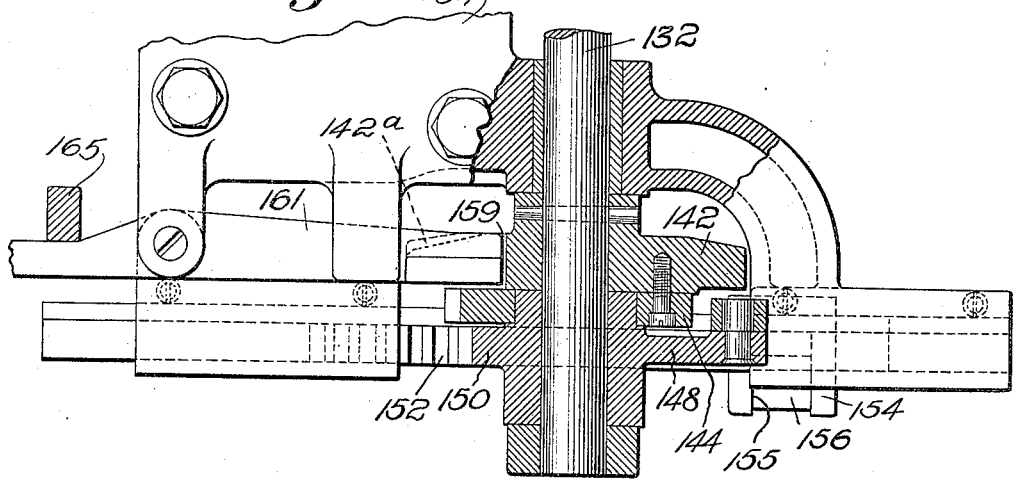
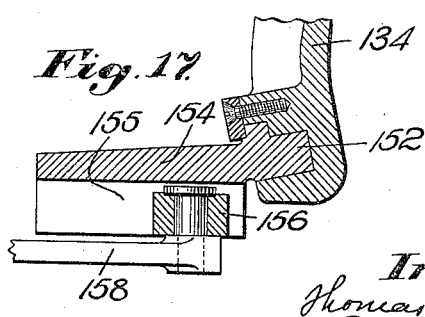

UNITED STATES PATENT OFFICE.

THOMAS G. PLANT, OF BOSTON, MASSACHUSETTS.

HEELING-MACHINE.

958,302.     Specification of Letters Patent.    Patented May 17, 1910.

Application filed January 27, 1908, Serial No. 412,727. Renewed December 9, 1909. Serial No. 532,250.

*To all whom it may concern:*

Be it known that I, THOMAS G. PLANT, a citizen of the United States, residing at Boston, in the county of Suffolk and State of Massachusetts, have invented an Improvement in Heeling-Machines, of which the following description, in connection with the accompanying drawings, is a specification, like characters on the drawings representing like parts.

This invention relates to machines for operating upon the heels of boots and shoes, and more particularly to machines for inserting nails in heels by which to secure the latter to shoes.

For purposes of illustration, the invention will be described herein as embodied in a heel loading machine, *i. e.*, a machine in which heels are prepared for attachment to shoes by inserting attaching nails in them.

The invention is designed to provide a machine of the general character above suggested which shall be of improved construction and simple, efficient and accurate in operation. One practicable manner in which these objects may be attained will more fully appear in the succeeding specification which describes an illustrative machine embodying the various features of the invention.

The various features of the invention will be best understood from a description of one embodiment thereof, such, for instance, as shown in the accompanying drawings, in which:

Figure 1 is a front elevation of the machine, omitting the nail supplying mechanism, and the work holders; Fig. 2, an enlarged front elevation of the lower part of the machine shown in Fig. 1; Fig. 3, an enlarged front elevation of the upper part of the machine shown in Fig. 1, shown as perpendicular to the ground line for ease in delineation; Fig. 4, a top view of the movable cross head shown in Fig. 3, in part broken away; Fig. 5, a detail horizontal section on the line 5—5 of Fig. 3, in part broken away; Fig. 6, a side elevation of the lower part of the machine viewed from the left in Fig. 2; Fig. 7, a detail elevation of part of an emergency stop mechanism, part of the machine frame being shown in section; Fig. 8, a vertical section crosswise the machine on a line 8—8 of Fig. 6 and viewed from the right in Fig. 6 in the direction of the arrows; Fig. 9, a vertical section from front to rear of the machine on the line 9—9 of Fig. 2 and viewed from the left in Fig. 2; Fig. 10, a detached detail elevation of certain parts partially hidden in Fig. 9; Fig. 11, a horizontal section on a line just above the work holders and below the nail block, looking in the direction of the arrows on Fig. 9; Fig. 11ª, a detail in plan of a portion of the nail carrier actuating means; Fig. 12, a horizontal section on the line 12—12 of Fig. 6; Figs. 13 and 14, detail vertical sections, shown as perpendicular for ease in delineation, from front to rear of the machine and showing different stages in the preferred operation of the illustrative machine; Fig. 15, a detail in plan of a portion of the operating means for the heel presenting mechanism; Fig. 16, a front elevation, partly in section, of the parts shown in Fig. 15; and Fig. 17, a detail vertical section on the line 17—17 of Fig. 15, viewed from the left.

In the embodiment of the invention selected for illustrative purposes, and referring more particularly to Fig. 8, the work is sustained during the operation of the machine on a work support or anvil 30 having a threaded stem engaging an adjusting nut 31. The latter is seated in the upper end of a plunger 32 and is confined against axial movement relative to the plunger. A pin 33, mounted in the plunger 32, engages between arms of a fork at the lower end of the anvil stem to prevent rotation of the latter. The plunger 32 is mounted in a sleeve 34, inclosing a spring 36 interposed between appropriate shoulders on the plunger and sleeve. A pin 38 in the sleeve engages a slot in the plunger 32 and limits the action of the spring 36. The lower end of the sleeve 34 has a cam roller 40 to engage an anvil cam 42 loosely mounted on a grease bushing upon the main shaft of the machine and rotated by means hereinafter made clear.

A heel sustained on the anvil 30 is preferably held against the lower face of a nail block 44, and the anvil cam 42 exemplifies means for relatively moving the work support and nail block to engage a heel between them. For the purposes of the specific machine the anvil cam 42 elevates the anvil 30 to clamp a heel against the nail block. The spring 36 is of such strength as to permit the plunger 32 and the anvil to yield slightly in relation to the sleeve 34 and cam 42 to compensate for varying thicknesses of heels, but is strong enough to sustain the heel without vertical movement during the pricking and loading operation. The anvil 30 has a depending finger 46, graduated according to different heights of heels, and the upper edge of the adjusting nut 31 serves as a pointer for the scale enabling the operator readily to predetermine adjustments to suit varying dimensions of work. The sleeve 34 is mounted in a vertical cylindrical slideway, formed centrally in a stationary beam 48 of the machine frame and is held from rotative movement by a set screw 41 (Fig. 9) engaging a vertical groove in the sleeve. Uprights of the machine frame support the beam 48 and also support a stationary nail block beam 52, appropriately recessed to supply the usual tongue and groove mounting for the removable nail block 44. When in position on its beam 52, the nail block 44 is held in place (Fig. 5) by a rotatable locking wedge 53 eccentrically mounted on a handle shaft 55 which is turned to rotate the wedge into engagement with a notch in the nail block.

Preferably the intended offices of the machine are performed by an appropriate tool or tools when a heel is engaged between the anvil 30 and the nail block 44. In the illustrative machine (Fig. 3) there are two groups of tools—a gang of awls 54 and a gang of drivers 56 which in the usual manner enter apertures in the nail block 44. An awl block and a driver block are removably mounted respectively in the arms of a turret 58, rigid with a turret shaft 60 which is journaled in depending ears of a cross head 62. The turret has a sector gear 64 engaging a pinion 66 on a shaft 68 in the cross head; and on said shaft (Fig. 13) is fixed a second pinion 70 meshing with a rack on a superposed rack bar 72 (Fig. 4). The rack bar 72 is supported for endwise movement in brackets on the cross head 62, and at one end of it has a second rack 74, engaged by a pinion 76 splined to a vertically arranged tool changing shaft 78. When the shaft 78 is rotated the rack bar 72 is reciprocated endwise and the turret 58 is rotated on its shaft 60 to place the awls 54 and drivers 56 alternately in operative position.

Referring now to Figs. 8, 9 and 10, the tool changing shaft 78 extends downwardly through bearings in the beams 52 and 48 and, at its lower end, has a rigid bevel gear 80, which (Fig. 10) is engaged by a sector gear 82 on an arm 83, loosely mounted on a stud shaft 84 extending across the rear of the machine. The arm 83 is engaged on opposite sides by adjusting screws 86, 86 on the forked end of an actuating lever 88 for preliminarily setting the initial position of the lever. At its lower extremity the lever 88 has a cam roller 90 engaging a path cam 92 (Fig. 9) in a disk on the driving shaft at the rear of the machine. As the cam 92 rotates it rocks the lever 88, rotates the tool changing shaft 78 and, therethrough, rocks the turret 58.

To produce the relative motion by which the specific tools act in respect to the work in the illustrative machine, the cross head 62 is vertically reciprocated. This reciprocation moves the pinion 76 (Fig. 4) axially on the shaft 78 and, to provide for this movement, the pinion is splined to slide on the shaft 78 and is mounted on the cross head 62 so as to be carried vertically with it.

Referring now to Figs. 3, 6 and 8: The cross head 62 is fixed at the upper extremities of slide rods 94, mounted for vertical reciprocation in bushings in the beams 48 and 52. The lower extremity of each rod 94 has a yoke 96 (dotted lines Fig. 6) to straddle the main shaft and each yoke has two rollers 98 and 99 to engage respectively frog cams 100 and 101, said cams being preferably so related that they move the rods 94 positively both upward and downward. The cams 100 are the depressing cams which serve to move the cross head down to project the tools toward the heel. In order to hold the cam rollers 98, 98 snugly against their cams 100, 100 and thereby contribute to the smoothness of the machine's operation, it is preferred to employ springs 102 connecting stationary pins in the frame of the machine with ears on the yokes 96, respectively. Antifriction rolls 97 on the lower ends of the yokes 96 move in guides 97$^a$ on the frame to steady the lower ends of the yokes and inforce their movement in a right line.

Preferably some means is provided for guiding the awls or drivers in their downward movement in order to aline them with the apertures in the nail block. A convenient exemplification of such guiding means is shown in Figs. 8, 13 and 14 and comprises a vertically disposed guide slot 104, supplied by an upwardly projecting rib of the nail block beam 52. This slot is disposed adjacent the path of movement of the awls and drivers and is engaged during the descent of the reciprocating cross head 62 by one or the other of rollers 106, 107 mounted, respectively, on the awl and driver arms of the turret. When the awls stand in their inactive position, shown in Fig. 3, the roller 106 is elevated above the guiding slot 104 and the turret is free to be rocked on its shaft. When, however, the cross head begins its descent, for the pricking operation, the roller 106 enters the bell mouth of the slot 104 and centers the awls 54 in register with the holes in the nail block. The roller 107 on the driver arm of the turret coöperates with the slot 104 in like manner when the drivers are presented in operative position and are depressed. The slot 104 is of such length that a roller 106 or 107 departs from centering engagement with it after the awls or drivers have entered well into the nail block; and said roller is then received into the lower bell mouth of the slot 104, where it is free to swing as the awls or drivers center or adjust themselves. Thus if awls or drivers be bent or warped they will first be inserted safely in the nail block and will then be free to determine their own path with minimum lateral strain occasioned by their warped or bent condition.

It will be noted that the upwardly projecting rib in which the slot 104 is formed extends adjacent the path of movement of the awls and drivers, and that such awls and drivers move within the vertical limits of such rib. The rib thus acts as a guard or protective covering for the rapidly moving nailing devices to prevent injury to an attendant at the rear of the machine.

The preceding description has sufficiently outlined some of the general features of the specific illustrative machine. It is expedient now to describe a convenient manner of transmitting and utilizing power to operate the parts described.

Referring now to Figs. 8, 9 and 12: The machine is driven through a belt pulley 108, arranged to be clutched as hereinafter described, to the driving shaft 110. The shaft 110 has keyed to it a pinion 111 meshing with a gear 112 fast on the main shaft 114. Also fast to the main shaft 114 is a gear 116, meshing with a gear 118 fixed upon a cam sleeve 120 loosely mounted upon the drive shaft 110. The cam sleeve 120 has a fixed gear 122 meshing with a gear 124 mounted on a grease bushing on the main shaft 114. The gear 124 has an elongated hub, which sustains the anvil cam 42. The timing of this particular system of gearing is such that the power speed of the driving shaft 110 is reduced through the pinion 111 and gear 112 for driving the main shaft 114. The speed of the main shaft 114 is also reduced (conveniently 1 to 2) through the gears 116 and 118 for driving the cam sleeve 120 which encircles the power shaft 110. For the purposes of the specific machine, it is preferred that the anvil cam 42 rotate in unison with the various operating cams on the sleeve 120 and, consequently, the latter, through the equal gears 122 and 124, drives the anvil cam 42 about the main shaft 114. The turret cam 92, hereinbefore described, is formed in one side of the gear wheel 118.

The preferred cycle of operations of the machine begins with the described parts in the positions indicated in Fig. 1. The awls 54 stand in operative position. The anvil 30 and nail block 44 are separated to receive between them a heel which may be introduced in any practicable manner. When a heel is in place the anvil cam 42 (Figs. 8 and 9) elevates the anvil 30 to clamp the heel against the nail block 44; and the cross head cams 100 (Figs. 6 and 8) depress the cross head 62 to insert the awls 54 into the heel. The anvil cam 42 continues to hold the heel against the nail block as the awls are withdrawn and replaced by the drivers upon the operation of the tool changing cam 92. After the awls leave the nail block and before the drivers descend, nails are supplied to the nail block in any practicable or usual manner; and thereupon the drivers are depressed by the cross head cams 100 to insert the nails in the recently pricked holes of the heel.

It will be observed that the specific anvil cam 42 and the cross head cams 100 revolve about a common axis; and both act with direct pressure to move respectively the anvil and the cross head. This utilizes the power of the cams to the best advantage by applying it directly in the line of movement of the actuated parts. The cross head cams act to depress the cross head twice in succession—for pricking and then for driving—while the anvil cam 42 acts but once to elevate the anvil and hold a heel against the nail block during both the pricking and driving operations. This time relation is conveniently secured by mounting the cross head cams 100 directly on the main shaft of the machine, mounting the anvil cam 42 on a counter-driven hub, encircling the main shaft, and driving said hub at one-half the speed of said shaft. This arrangement is of considerable advantage. For example, it permits the double reciprocation of the cross head to be effected by single throw cams of easy unabrupt operation, supplies a like advantage in connection with the anvil cam 42, and at the same time provides that the parallel motions of the cross head and anvil be actuated by direct pressure from a common axis.

Insofar as concerns the above described features of the illustrative machine, separately considered, heels may be introduced in any practicable manner. It is advantageous, however, that said features coöperate with some means for holding heels in position to be acted upon; and that means be supplied to introduce heels in succession, automatically or otherwise.

A rotary heel carriage 130 is shown in plan view, Fig. 11. This carriage is preferably in the form of a three armed spider carrying upon its arms three heel holders H¹, H², and H³, of any suitable type, so arranged that when one of them presents a heel in position to be clamped between the anvil 30 and the nail block 44, another will have brought a second heel into position in readiness to replace the one then beneath the nail block, and the third shall be in a position accessible to the operator for the introduction of a new heel. For a detailed description of the preferred construction of these holders reference may be had to the copending application for U. S. Patent of W. C. Stewart, Serial No. 409,142, filed Jan. 3, 1908.

Referring now to Fig. 9: The carriage 130 is fixed at the upper end of a heel carriage shaft 132, the latter being journaled (Fig. 2) in the arms of a heel carriage frame 134 mounted upon the beam 48. Extending forwardly from the beam 52 is a guard plate 131 which preferably overlies the path traversed by the heels as they are conveyed from receiving to nailing position. The plate 131 also acts as a guide to correctly position the heel in its carrier as it is being placed therein and to maintain the tread faces of the heels in the proper plane for correct positioning under the nail block 44. The heel carriage 130 is preferably rotated automatically by the power of the machine to introduce a new heel for each cycle of operations.

Referring now to Figs. 9, 15 and 16: Fixed upon the lower extremity of the heel carriage shaft 132 is a block 142 having rigidly secured upon its under side, a ratchet wheel 144. For the purposes of the specific organization, this ratchet wheel has three teeth (Fig. 15) corresponding in number and disposition to the three heel holding devices of the carriage 130. The teeth on the ratchet wheel 144 are engaged in succession by a spring-held pawl 146 pivoted at the end of an arm 148 of a sector gear 150 loosely journaled upon the end of the shaft, as shown in dotted lines in Fig. 15. The sector gear 150 engages a horizontally reciprocable rack 152 mounted to slide endwise in appropriate bearings on the heel carriage frame 134. Extending from the rack 152 (Figs. 15 and 17) is an arm 154 forming an elongated slideway 155 to receive a slide block 156, upon the end of a cam lever 158 (Fig. 11) fulcrumed upon the frame of the machine and having a cam roller to engage a heel carriage actuating cam 160. Preferably, the cam lever 158 comprises two parts fulcrumed upon the same pivot and adjustably and rigidly connected by adjusting screws 162. The heel carriage actuating cam 160 is fixed upon the cam sleeve 120 which encircles the driving shaft 110 and is counter-driven from the main shaft as described. The cam 160 and lever 168 stand, when the machine is at rest, in the position shown in Fig. 11, with the rack 152 at the right hand extreme of its travel, it having rotated the pawl 146 and ratchet 144 clockwise, to introduce a new heel just previously to the last stopping of the machine. After the machine starts again the cam 160 rocks the forward end of the lever 158, in Fig. 11, to move the rack 152 to the position shown in Fig. 15 wherein the pawl 146 engages a new tooth of the ratchet 144; and thereafter the cam 160 and lever 158, returning, to the positions shown in Fig. 11, move the rack 152 to the right in Fig. 15 and thereby rotate the heel carriage through the ratchet 144 to introduce another heel.

It is expedient to provide some means to hold the heel carriage in its positions of rest to insure the presentation of a heel in proper position; and for this purpose (Figs. 15 and 16) the block 142 is provided with three radial slots 159 to be engaged in succession by a lock lever 161 fulcrumed to the heel carriage frame 134 and held normally (Fig. 2) in locking position within one of the slots by a spring 163 connecting one end of the lock lever with the machine frame. Overlying the lever 161 near the spring 163 (Fig. 2) is a controlling lever 165, shown in dotted lines in Fig. 6. Referring to the latter figure, the controlling lever 165 is fulcrumed at 171 to the frame of the machine and has at its rear end a roller to engage an unlocking cam 173 which, preparatory to each rotary step of the heel carriage, rocks the forward end of the controlling lever 165 clockwise, in Fig. 6; depresses the left hand end, in Figs. 15 and 16, of lock lever 161, thereby lifts the right hand end of said lever out of a slot 159 and unlocks the block 142 leaving the heel carriage shaft 132 free to be rotated. When the carriage 130 has been swung to present a new heel it is again locked in position by the lever 161 again dropping into one of the slots 159.

Overthrow of the heel holder carriage in its step by step movement is prevented by beveling off the approach edge of each slot 159 as at 142$^a$ (Figs. 2, 15 and 16). By this means when the block 142 has been turned a sufficient distance as that the engaging end of the locking lever 161 may be moved downward into one of the slots 159 by its spring 163, the bevel 142$^a$ has already permitted the spring 163 to move the engaging end of the lever 161 downward so that it is below the level of the far edge of the slot. The locking lever 161 thus acts as a stop against which the block 142 abuts when the carriage 130 has been rotated through just the proper angle to properly position a heel beneath the nail block 44. The spring 163 is so placed that it serves to hold the controlling lever 165 in engagement with its cam while permitting the lever to be depressed by hand in the event of the operator desiring to unlock the carriage 130 for purposes of hand manipulation. The forward end of the lever 165 is conveniently made as a handle (Fig. 6) for this purpose.

In loading heels, nails are commonly inserted only part way into the heels, for example as shown in Fig. 14, wherein a portion of the head end of each nail projects beyond the tread face. One manner of effecting such a result, in loading a heel held closely against the underside of the nail block, is to use drivers of such length that at the end of the stroke of the turret their lower ends reach only to a point somewhat above the lower face of the nail block. With such a construction on recession of the drivers the loaded heel is left in engagement with its holder and with the head ends of the nails still in the nail block passages. This prevents movement of the heel carriage to present a new heel to the nailing devices. It is desirable therefore, to provide some means for stripping the loaded heel from its holder and from the nail block so that the heel carriage may be rotated. Such means is provided in the illustrative embodiment of the invention by the arrangement now to be described.

For the purposes of the illustrative machine the devices are made of such length that the throw of the cross head cams 100 move the drivers substantially through the nail block (see Fig. 14); and therefore if a heel be held against the nail block throughout the full movement of the drivers the heels will be loaded with the nails driven all the way into the heel instead of being loaded in the usual manner. In order to leave part of each nail projecting from the heel while using a long driver stroke the anvil 30 is preferably arranged to retreat before the descending drivers after the nails have been inserted to the desired extent. Referring now to Fig. 9 this retreat of the anvil is provided for by a depression $x$ on the anvil cam 42. Said cam, moving in the direction of the arrow in Fig. 9, first elevates the anvil; then enters upon the long dwell $y$ to sustain the heel against the action of both the awls and drivers. The dwell $y$ is of such length that when the nails have been inserted to the desired extent, the depression $x$ permits the anvil to descend under pressure of the drivers in consonance with the downward advance of the drivers until the limit of their stroke, which (see Fig. 14) leaves the heel stripped from both the nail block and heel holder.

Obviously, the time relation prevailing between the cross head cams 100 and the anvil cam depression $x$ determines the extent to which the nails will be driven before the anvil is permitted to descend. To provide for driving nails to different extents, as may be desirable with heels of different heights, or in making ogee heels, the anvil cam 42 is made angularly adjustable about its axis of rotation in order that its depression $x$ shall operate earlier or later in relation to the action of the cross head cams 100. This angular adjustment of the anvil cam 42 is provided for conveniently in the specific machine (Figs. 8, 9 and 12) by securing it adjustably to the gear 124 by bolts 126 threading into the gear 124 and extending through segmental slots (Fig. 9) in the cam 42. An eccentric 128 (Fig. 12), journaled in the gear 124, plays in a radial slot in the cam 42, and has a squared end to be engaged by a wrench for turning it and thereby moving the cam 42 about its axis to secure any desired adjustment. When adjusted the cam may be secured rigidly to its gear 124 by screwing up the clamping bolts 126. Preferably, there is also used a dowel pin 125 which may be screwed into any one of a series of circumferentially arranged holes 125$^a$ in the cam 42 and project into any one of a similarly arranged series of holes in the gear 124 staggered with relation to the holes 125$^a$ to permit a great range of adjustment by the eccentric 128. The pin 125 acts as a steady pin to rigidly lock the cam and gear together.

It has been explained above that the completion of the nail driving operation, and the downward retreat of the anvil 30 leaves a loaded heel resting upon the anvil, and otherwise unsupported. As the rotary heel carriage 130 moves a heel from receiving position to nailing position, the arm of the spider supporting the holder from which the heel has just been stripped will strike against the recently loaded heel, since the anvil has not been dropped sufficiently to provide clearance, and will discard it from the anvil. If desired, a chute may be provided to receive heels so discarded and to convey them out of the way of the moving parts. Thus the illustrative machine has not only automatic means for introducing heels to the operation of the machine, but has also automatic means for discarding them after being loaded.

In a number of heels there are likely to be found some of excessive height, even though all of the group are intended to be of the same dimensions. If such heels be introduced in succession to the machine, those of excessive height may prove to be too thick to suit the prevailing relative adjustment of the anvil 30 and nail block 44; and if permitted to undergo the normal operation of the machine, they are likely to be greatly compressed and distorted or severely to strain the machine. It may also happen that the operator will omit to lower the anvil to accommodate a higher heel after having been loading heels of a less height. It is expedient to therefore provide for ejecting heels of a height which is excessive for the particular adjustment of the machine before they have been carried to a position between the anvil and nail block.

Referring now to Fig. 8; the anvil 30 has projecting from it an arm sustaining a detector 198 which projects upwardly to a point adjacent the path of movement of the heel seat faces of heels in the rotary carriage 130. The height of the detector 198 (when in its effective position) is such that heels of normal height for the particular machine adjustment, will pass over it, undisturbed, while those of excessive height will strike against the detector and be removed by it from the holder in the further rotation of the heel carriage. The detector may be provided with engaging points 198ª. In the timing of the specific machine, the heel carriage 130 is rotated to introduce a new heel during the descent of the anvil 30. In order to maintain the detector 198 in its effective position for a short period of time, the anvil cam 42 (Fig. 9) has a short dwell $z$ which holds the anvil and detector in proper position while the advancing heel either passes over the detector or strikes it and is knocked out of its holder.

With a general form of detector such as just described and with the described, or a similar, construction of heel carriage it may happen that after a heel of excessive height has been forced from its holder it will be jammed by the stationary detector against some moving part of the heel carriage, for instance the spider arm on which the holder, which has just lost its hold on the heel, is mounted. In such event continued rotation of the heel carriage would cause breakage. To avoid such a disaster the detector 198 is preferably hinged to its supporting arm as at 199 (Figs. 8 and 9) and maintained in upright position by a suitably attached spring 200. The spring 200 is strong enough to permit the heel to be knocked from its holder but weak enough to permit the detector to swing backward on its hinge 199 if the heel does not drop quickly enough to clear the moving heel carriage.

It is well known to those skilled in the art that heels taper, more or less, from the heel seat to the tread face, this taper being most pronounced at the back of the heel. If nails are driven perpendicular to the heel lifts a considerable portion of the larger lifts at the back of the heel remain unsecured resulting in inefficient final attachment, at a point where the attachment should be particularly secure. An efficient remedy has been found in driving the nails obliquely to the heel lifts and in a direction toward the rear of the heel, more or less parallel to the general plane of the lateral surface at the rear of the heel.

The parts of the machine heretofore described may be combined to coöperate for driving nails, supplied to the nail block, perpendicularly to the heel lifts or obliquely thereto as may be desired. Preferably the nails are driven obliquely and to this end the parts of the machine are so constructed and arranged that the path of movement of the drivers and the plane of the tread face of the heels presented thereto are oblique to each other. Such an arrangement is effected by inclining that portion of the machine frame, which supports the awl and driver turret and moves said turret toward and from the nail block, while maintaining the heel carrying devices horizontal. The construction is shown most clearly by Figs. 1, 2, 6 and 9. The desired result is thus obtained and the arrangement of the parts is such that it is particularly advantageous to the operation of the machine in that the heel holders H, and their guide plate 131 above them, are maintained level with the ground line and therefore in the most convenient location for rapid and accurate insertion of heels. If the heel carriage spindle were inclined so as to present heels properly to a vertically moving gang of drivers for oblique driving of the nails, the plane of the heel holders would be such, when in position to receive heels, that the operator would have great difficulty in properly inserting a heel in the limited time allowed by the operation of the machine. In Fig. 11 the heel holder H³ is shown in heel receiving position and it is obvious that were the spindle 132 inclined to the vertical the plane of the holder would slant not only toward the back of the machine but toward the center of rotation as well. This would place the guide plate 131 upon a compound slant at heel receiving position and the operator would be forced to tip the tread face of the heel both inwardly and rearwardly and move the heel as a whole at an angle, in order to obtain a proper engagement therewith. With the spindle 132 vertical, and the guide plate 131 therefore horizontal, the holders are moved in a horizontal plane and merely the simplest and most natural movement of the operator, straight forward and upward, is required to properly place a heel within the holder at heel receiving position.

In the preceding discussion it has been asumed that at appropriate times gangs of nails are placed in the apertures of the nail block. While this may be effected in any practical manner, it is preferred that the various other elements of the specific organized machine coöperate with suitable nail conveying means, such, for example, as a nail carrier movable periodically between nail receiving position and a position to discharge nails to the nail block. A convenient form of nail carrier is exemplified in Figs. 2, 3 and 11ª; and comprises a carrier arm 206, encircling and clamping a rotatable bushing mounted for convenience upon one of the slide rods 94 of the cross head. The nail carrying block 207 is sustained by this arm. The arm 206 has a sector gear 208 engaged by a pinion 209 fixed at the upper end of a nail carrier shaft 210. At its lower extremity the nail carrier shaft has a beveled pinion 212, which (Figs. 6 and 8) is engaged by a segmental rack 214, mounted to rock about the stud shaft 84. The rack 214 has a second rigid arm 216, the end of which is connected by a spring 218 with a pin on a nail carrier actuating lever 220. The spring 218 holds the lever arm 216 against a rigid and adjustable stop 222 on the actuating lever 220. The latter has a cam roller 224 to engage a nail carrier cam 226 (Figs. 6 and 11); and the roller is held against the cam by a spring 228 connecting one end of the lever 220 with a pin on the machine frame. With the described arrangement the cam 226 at appropriate times (Fig. 6) rocks the lever 220 clockwise about the stud shaft 84; said lever through the spring 218 rocks clockwise the arm 216 and the segmental rack 214; the latter rotates the nail carrier shaft 210 and thereby moves the nail carrier arm 206 from nail receiving position (Fig. 2) to discharge and driving position over the nail block, whence it is returned by the spring 228 upon further rotation of the cam 226. Nails are discharged from the carrier block 207 by operating a sliding cover plate 205 (Fig. 11ª) in the usual manner.

The nail carrying block 207 may be supplied with gangs or groups of nails by any appropriate form of mechanism for such a purpose, but it is preferably so supplied by automatic means such as described and claimed in a co-pending application for U. S. Patent of W. C. Stewart, Serial No. 409141, filed January 3, 1908.

It is important in using a nail carrier of the type shown, that the carrier deliver its nails to the nail block and retire before the drivers descend sufficiently far to risk striking the carrier. In order to avoid breakage in the event of delayed action, the nail carrier arm 206 is preferably moved yieldingly both toward and from its discharging position by the springs 218 and 228 respectively. As a further precaution against interference between the drivers and the nail carrier, it is desirable to employ means for stopping the machine in case the nail carrying block 207 remains too long in discharging position over the nail block 44.

Any appropriate or convenient form of starting and stopping mechanism in this connection may be used, but preferably a friction clutch such as is partially shown in Figs. 2, 6 and 12 and in detail in the U. S. Patent to John J. Heys, 677,132, dated June 25, 1901, is employed. In the accompanying drawings the friction bands, described in said patent, are shown within the pulley 108 at 230 and 232 (Fig. 12) the latter being in the form of a split ring arranged for expansion by means of a wedge operated by movement of a sliding sleeve 234 on the driving shaft 110 all substantially as shown in said patent. The sleeve 234 is moved as usual by a suitably connected yoke 236 (Fig. 6), fulcrumed on a stud extending from the machine frame, which yoke is rocked by longitudinal movement transversely of the machine of a shipper bar 238 connected to an arm 237 extending downwardly from the bearing of the yoke 236. The bar 238 is slidably mounted in bearings in the lower portion of machine frame and is normally pressed to the left (in Fig. 2) by a suitably mounted spring 240 so as to maintain the sleeve 234 in position at the right hand end of its movement (in Fig. 12) and the band 232 thereby contracted and out of engagement with the band 230.

Movement of the sleeve 234 to the left (in Fig. 12) is imparted by movement of the shipper rod to the right (in Fig. 2) preferably through the following train of mechanism. A foot treadle 242 (Fig. 2) is fixed upon a rock shaft 244 (Fig. 2 and dotted lines Fig. 12), which shaft has also fixed upon it an arm 246 the end of which bears upon one arm of a bell crank lever 248 (Figs. 2 and 8) fulcrumed on a stud 250 in the machine frame, and bearing with its other arm (formed as a yoke) against the left hand face (in Fig. 8) of a collar 252 fixed on the shipper rod 238. Thus when the treadle 242 is depressed pressure is brought to bear on the collar 252 in such a direction that the sleeve 234 is moved, through the lever arm 237 and yoke 236, to throw the clutch bands into engagement and start rotation of the driving shaft 110. The connection between the arm 248 and the bell crank 246 is preferably through an adjusting screw 254ˣ (Fig. 2) so that the stroke of the shipper rod 238 may be properly regulated. The spring 240 maintains the treadle 242 normally raised in operative position, as shown in Fig. 2. A latch 254 (Fig. 7) is pivotally mounted upon a stud 256 above the treadle 242 which gives way before the descending treadle lever but is drawn in place again above it by the action of a spring 255 to hold it in its depressed position with the clutch thrown in. The latch 254 may be removed from its position over the treadle lever by depressing an auxiliary treadle 258 (Figs. 7 and 12) or moving a hand lever 259 (Fig. 6) fixed on the stud shaft 256.

One form of safety device to prevent injury to the machine, should the nail carrier remain too long in nail discharging position, is shown in Figs. 6 and 7. The latch 254 is provided with a rearwardly projecting lug 260. Pivotally mounted upon a stud 261 in the frame is a bell crank 262 having pivoted to one arm, and projecting toward the lug 260, a lever 263. This lever is yieldingly mounted (see Fig. 7) by means of a suitably connected spring 264 and a stop pin 265 in the frame, and carries a roller 266 near its forward end. This roller is adapted to be engaged by a cam projection 267 in the inner surface of the gear 112. To the other arm of the bell crank 262 is connected a rod 268, which extends between the bell crank and a projection 216ª of the nail carrier operating lever 216. The construction is such that each time the nail carrier is moved into discharging position the forward end of the lever 263 is moved to a position beneath the lug 260 on the latch 254. On movement of the carrier back to nail receiving position the motion of the operating lever 216 withdraws the lever 263 before it is lifted by engagement of the cam 267 with the roll 266. Should the nail carrier stick in discharging position, however, no movement would be imparted to the lever 216 from rotation of the cam 226 and therefore the lever 263 would be held in its forward position under the latch lug 260 when the cam 267 in its movement elevates the lever 263. The latch is thus removed from the treadle lever 242 and the spring 240 is thus released to at once throw out the clutch.

Any convenient form of brake may be used with the clutch. As illustrated a disk 270 (Figs. 11 and 12) is keyed to the driving shaft 110 and a shoe 271 (Fig. 6) is mounted to be normally maintained in braking engagement by a spring 272. In this position an arm 273 on the shoe mount rests in a recess 274 (dotted lines in Fig. 8) in the shipper rod 238. When the shipper rod is moved to start the machine the arm 273 is depressed and the brake shoe disengaged. The shoe 271 may also be disengaged by a hand lever 275 (Fig. 6) to permit turning the machine over by hand.

The general operation and management of the machine is similar to other types of heel loading machines and such operation has already been described to some extent in connection with the detailed description of the illustrative embodiment of the machine. It will be necessary now to give merely a brief description of the adjustment of the parts and timing of the various operations.

The anvil 30 is adjusted to the general height of the size or style of heel to be operated upon by movement of the nut 31. This simultaneously shifts the position of the detector 198. The anvil cam 42 is adjusted to determine time at which the anvil is permitted to retreat before the descending drivers. The heel holders are adjusted for the kind of heel being operated upon. The machine is started and heels are inserted in the holders and then fed to nailing position. After a heel has been clamped between the anvil 30 and nail block 44 and pricked and the awls 54 have risen, the turret 58 is turned to bring the drivers 56 into alinement with the holes in the nail block and at the same time the nail carrier block 207, having previously received its gang of nails, is advanced to position over the nail block. At about the time the drivers reach a vertical position, the nail carrier discharges its nails and as the drivers descend it moves away from the nail block and to nail receiving position. The nails are driven and are stripped from the nail block and the heel is stripped from its holder by reason of the formation of the anvil cam 42 which in its operation allows time for the loaded heel to be swept off the anvil to make room for the advancing work.

While the particulars of construction herein set forth are well suited to one form of the invention, it is not to be understood that these particulars are essential since they may be variously modified within the skill of the artisan without departing from the true scope of the actual invention as defined by the following claims.

What is claimed as new, is:—

1. In a heeling machine the combination with a nail block, of a heel carriage at one side of said block, means to move said carriage in a horizontal plane to present heels horizontally to said block, nail driving devices on the other side of said block, means to supply nails to said nail block, and means to move said nail driving devices in an oblique path relatively to the path of movement of said heel carriage to drive said nails obliquely into the heel.

2. In a heeling machine the combination with a rotatably mounted heel carriage constructed to support a plurality of heels in a horizontal plane, nailing devices including drivers, means to rotate said carriage to present heels horizontally in succession to said nailing devices, and means to move said drivers in an oblique path toward and from the plane of the tread faces of the heels so presented.

3. In a heeling machine, the combination of a nail block and a rotatable heel carriage provided with a plurality of heel holders movable successively from loading position to a position adjacent the nail block, power means for rotating the heel carriage, and a stationary plate supported independent of the nail block and disposed above the path of movement of the heels and having a surface with which the face of a heel lift contacts as the heel is positioned in a holder at the loading position, said plate extending from a point above the loading position of the heels to a point adjacent the nail block.

4. In a heeling machine, the combination of a nail block, a stationary beam on which said block is mounted, a rotatable heel carriage provided with a plurality of heel holders, means to actuate said carriage to move heels successively from loading position to a position beneath the said nail block, and a guide plate supported independent of the nail block and disposed above the path of movement of the heels and having a surface with which a heel lift contacts as it is placed in a holder at the loading position, said plate extending from a point above the loading position of the heels to a point adjacent the nail block.

5. In a heeling machine, the combination of a nail block having a horizontal face and nail driving devices, means for moving the nailing devices in an oblique direction toward and from the nail block, a heel support, an actuator for moving said heel support obliquely toward the nail block, and means for adjusting the length of the heel support in a direction oblique to the face of the nail block while maintaining undisturbed relation between said support and actuator, said heel support including an anvil and a coiled spring sustaining said anvil.

6. In a heeling machine, the combination of a nail block having a substantially horizontal heel engaging surface, nail driving devices, a heel support provided with an anvil having a substantially horizontally disposed heel supporting surface, a heel carriage for presenting heels horizontally between the horizontal heel engaging surfaces of the nail block and anvil, and means to actuate said nail driving devices and heel support in a path oblique to the said horizontally disposed heel engaging surfaces.

7. In a heeling machine, the combination with a nail block, and nail drivers, of a heel support, means to clamp a heel between said support and nail block, means to move said drivers through the nail block in driving nails, means to cause said support to retreat from the nail block before the completion of the driving movement whereby the heel with its projecting nails may be stripped from the nail block, and means for presenting a heel to said support and for thereafter completely removing said heel therefrom prior to the presentation of a new heel thereto.

8. In a heeling machine, the combination with nailing means and a work support, of a cam for moving said support toward and away from the nailing means, means for driving said cam, and means to adjust said cam angularly to vary the timing of such movement relative to the nail driving movement.

9. In a heeling machine, the combination with nailing means and a work support, of means for causing relative approach and retreat of said parts, driving means therefor, and provision for varying the time of retreat of said parts relative to the movement of the driving means.

10. In a heeling machine, the combination with a nail block, nail drivers and a work support, of means for clamping the work between said support and nail block, means for imparting a driving stroke to the drivers, provision for permitting retreat of the work support before completion of the stroke of the drivers, and provision for varying the time of said retreat.

11. In a heeling machine, the combination with nailing means and means for presenting heels in succession thereto, of provision for ejecting heels of excessive height before they reach nailing position.

12. In a heeling machine, the combination with a nail block and a heel support, of provision for presenting heels in succession between said parts, means for relatively moving said parts to adjust the same for heels of a certain height, and a device sustained by one of said parts and movable therewith constructed and arranged to project into the path of movement of the heels and eject those of excessive height for the adjustment made.

13. In a heeling machine, the combination with a heel support and means for adjusting the same for heels of varying heights, of a yieldingly mounted ejecting device sustained by said support.

14. In a heeling machine, the combination with nailing means and a heel support, of means for relatively adjusting said parts to accommodate the height of heel to be operated upon, provision for presenting heels to the nailing means, and provision for preventing presentation of heels of a greater height prior to further adjustment of said parts.

15. In a heeling machine, the combination with an apertured nail block, of devices for operating on a heel movable into and out of said apertures and a support adjacent the path of movement of said devices, said moving parts and support having one a slot parallel with the apertures in said block and the other an engaging member to enter said slot, said slot and engaging member being constructed and arranged to permit disengagement after the devices have entered said apertures.

16. In a heeling machine, the combination with devices for operating on a heel, a nail block having apertures for the reception of said devices and means for moving said parts relatively toward and from each other, of means for guiding said devices and apertures into alinement, said means being constructed and arranged to lose control of the moving parts after said devices and apertures have become engaged.

17. In a heeling machine, the combination, with a movable cross head carrying devices to operate upon a heel, and a movable heel support in alinement therewith, of single throw actuating cams for said cross head and for said support also in alinement therewith all sustained upon a common shaft, and operating mechanism for said cams constructed and arranged to impart two movements to said cross head to each single movement of said heel support.

18. In a heeling machine, the combination with nailing means and a nail carrier, of means for moving said carrier in and out relatively to said nailing means, and provision for automatically stopping the machine upon retardation of the outward movement of said nail carrier.

19. In a heeling machine, the combination with nailing means and a nail carrier, of a start and stop mechanism, a latch to hold said mechanism in engagement, means to move said nail carrier toward and from the nailing means, and means to trip said latch and disengage the start and stop mechanism upon failure of the nail carrier to move away from the nailing means.

20. In a heeling machine, the combination with nailing means, a heel carriage arranged to support a plurality of heels and provision for moving said carriage to present heels in succession to the nailing means, of a locking device to stop movement of the carriage when a heel is in proper position relative to the nailing means, and automatic devices to unlock said carriage, said devices being also constructed and arranged for hand manipulation.

21. In a heeling machine, the combination with nailing means, a heel carriage arranged to support a plurality of heels and provision for moving said carriage to present heels in succession to the nailing means, of a slotted member and a locking bar one of which is sustained by and movable with said carriage, means to cause engagement of said bar and slot to lock the carriage when moved to proper heel presenting position, and means to prevent overthrow of said carriage.

22. In a heeling machine, the combination with nailing means, a heel carriage and provision for moving said carriage to present heels sustained thereby to the nailing means, of a locking and overthrow preventing device comprising a slotted member on the carriage, a locking bar overlying said member adapted to enter said slot and a beveled surface on the near side of the slot to permit said bar to fall below the upper edge of the far side of said slot before entering the slot.

23. In a heeling machine, the combination of a nail block and nail driving devices, a threaded stem carrying an anvil 30, an adjusting nut 31 engaging said stem, a plunger 32 carrying said adjusting nut, a reciprocating sleeve 34 carrying said plunger, means for reciprocating said sleeve, and a coiled spring 36 interposed between the sleeve 34 and plunger to yield under pressure of the nail block.

24. In a heeling machine, the combination of a supporting frame having a beam 52, a nail block 44, a heel carriage 130 having a plurality of heel holders, power operated means for moving said carriage to successively present heels below the nail block, and a stationary guide plate 131 secured to the beam 52 above the path of movement of the heels and having an under surface with which a heel lift contacts and by which it is positioned as a heel is placed in a holder, said plate extending from a point above the loading position of the heels to a point adjacent the nail block.

25. In a heeling machine, the combination of a nail block, an opposed heel support, means for moving the nail block and heel support toward each other to hold a heel between them, a reciprocating cross head, means for reciprocating the cross head in an oblique direction, a turret carried thereby and having awls and drivers for acting on a heel between the nail block and heel support, a rack mounted on the cross head for turning the turret, a pinion movable with the cross head and engaging said rack, a tool changing shaft to which said pinion is splined, and means for operating said shaft to reciprocate said rack independent of the oblique movement of the cross head.

26. In a heeling machine, the combination of a nail block and opposed heel support for holding a heel between them, a cross head, means to reciprocate the cross head in an oblique direction, nailing devices rotatably mounted on the cross head, a rack bar mounted to slide transversely on said cross head and operatively connected to the nailing devices to rotate the latter, a tool changing shaft, a pinion splined to the shaft and movable with the cross head, said pinion being operatively connected to the rack bar, and means to actuate said shaft to cause the rack bar to rotate the nailing devices independent of the oblique movement of the cross head.

27. In a heeling machine, the combination of a nail block and opposed heel support for holding a heel between them, a cross head, means to reciprocate the cross head, nailing devices rotatably mounted on the cross head, a rack bar mounted to slide on said cross head and operatively connected to the nailing devices to rotate the latter, a tool changing shaft, a pinion splined to the shaft and movable with the cross head, said pinion being operatively connected to the rack bar, a cam, and adjustable connections between said cam and shaft to cause the rack bar to move in a prescribed path and actuate the nailing devices independent of the cross head movement, said connections including a pinion and segment rack.

28. In a heeling machine, the combination of a nail block and heel support for holding a heel between them, a reciprocating cross head, a rack bar 72 carried by said cross head, a turret 58 rotatably connected to the cross head and operatively engaged with said rack bar 72, a shaft 78, a pinion 76 rotatable therewith and engaging said rack bar 72, a cam, an arm 88 and a rack 82, and operative connections between the rack and shaft 78 for actuating the latter from the former independent of cross head movement.

29. In a heeling machine, the combination of a nail block and heel support for holding a heel between them as it is supplied with nails, a reciprocating cross head, means for reciprocating the cross head in an oblique direction toward and from the nail block, a rotatable turret on said cross head and carrying nailing devices, a sliding rack bar for rotating said turret, a shaft and connected pinion for operating the rack bar, a cam, and adjustable operative connections between the cam and said shaft for moving the rack bar in a prescribed path for actuating the turret independent of cross head movement.

30. In a heeling machine, the combination of nailing means, a rotatable heel carriage provided with a plurality of heel holders, a sliding rack bar 152 in operative engagement with said heel carriage to cause rotative movement thereof, power operated means for moving said rack bar, and a lock for automatically stopping the heel carriage when a heel has reached nailing position.

31. In a heeling machine, the combination of nailing means, a rotatable heel carriage provided with a plurality of heel holders, a ratchet wheel 144 connected to said carriage, a pawl 146 for actuating said ratchet wheel to turn the heel carriage and bring a heel into nailing position, a sliding rack 152 for operating said pawl, power means for sliding the rack, and a lock for stopping the carriage with a heel in nailing position.

32. In a heeling machine, the combination of nailing devices, a rotatable heel carriage provided with a plurality of heel holders, a ratchet wheel, rack and pinion for rotating said carriage, a block 142 having stop engaging portions, a lock lever 161, a spring normally acting to engage the lock lever 161 with a stop portion of the block 142, a controlling lever 165 engaging the lever 161, and a cam for operating the controlling lever to unlock the lever 161 from the block.

33. In a heeling machine, the combination of nailing devices, a heel support for sustaining a heel during the action of the nailing devices, a nail carrier arm, a nail carrier shaft operatively connected to said arm, a cam, means for operating said cam, and yielding operating connections between said cam and nail carrier shaft to yieldingly actuate the nail carrier arm.

34. In a heeling machine, the combination of nailing means, a heel support for sustaining a heel for the action of said means, a nail carrier, start and stop mechanism for the machine, devices to maintain said mechanism in position with the machine in operation, means to move said nail carrier toward and from the nailing means, and means to free the start and stop mechanism from said devices to permit the machine to stop upon failure of the nail carrier to move away from nailing position.

In testimony whereof, I have signed my name to this specification, in the presence of two subscribing witnesses.

THOMAS G. PLANT.

Witnesses:
EDWARD H. PALMER,
WARREN G. OGDEN.